United States Patent
Diewald et al.

(10) Patent No.: US 11,210,103 B2
(45) Date of Patent: *Dec. 28, 2021

(54) EXECUTION OF ADDITIONAL INSTRUCTIONS PRIOR TO A FIRST INSTRUCTION IN AN INTERRUPTIBLE OR NON-INTERRUPTIBLE MANNER AS SPECIFIED IN AN INSTRUCTION FIELD

(71) Applicant: Texas Instruments Incorporated, Dallas, TX (US)

(72) Inventors: Horst Diewald, Freising (DE); Johann Zipperer, Unterschleissheim (DE)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 428 days.

This patent is subject to a terminal disclaimer.

(21) Appl. No.: 15/265,184

(22) Filed: Sep. 14, 2016

(65) Prior Publication Data

US 2017/0003973 A1 Jan. 5, 2017

Related U.S. Application Data

(63) Continuation of application No. 13/628,376, filed on Sep. 27, 2012, now Pat. No. 9,471,317.

(51) Int. Cl.
*G06F 9/38* (2018.01)
*G06F 9/30* (2018.01)
*G06F 9/46* (2006.01)

(52) U.S. Cl.
CPC .......... *G06F 9/3867* (2013.01); *G06F 9/3016* (2013.01); *G06F 9/3017* (2013.01); *G06F 9/30185* (2013.01); *G06F 9/3853* (2013.01); *G06F 9/3885* (2013.01); *G06F 9/467* (2013.01)

(58) Field of Classification Search
CPC .. G06F 9/3016; G06F 9/30185; G06F 9/3867; G06F 9/3885; G06F 9/467; G06F 9/3017; G06F 9/3853
See application file for complete search history.

(56) References Cited

U.S. PATENT DOCUMENTS

| | | | | |
|---|---|---|---|---|
| 4,972,342 A | * | 11/1990 | Davis | G06F 9/30058 712/234 |
| 5,941,983 A | * | 8/1999 | Gupta | G06F 9/3836 712/214 |
| 6,131,155 A | * | 10/2000 | Alexander | G06F 9/30043 712/207 |
| 6,311,266 B1 | * | 10/2001 | Smith | G06F 9/3836 712/214 |
| 6,430,676 B1 | * | 8/2002 | Koblenz | G06F 8/4451 712/207 |
| 6,813,707 B1 | * | 11/2004 | Batcher | G06F 9/30054 712/242 |

(Continued)

OTHER PUBLICATIONS

Hennessy and Patterson, Computer Archintecture A Quantitative Approach, 1996, Morgan Kaufmann, 2nd edition, 7 pages.*

(Continued)

*Primary Examiner* — Jyoti Mehta
(74) *Attorney, Agent, or Firm* — Charles F. Koch; Charles A. Brill; Frank D. Cimino

(57) ABSTRACT

A processor includes a plurality of execution units. At least one of the execution units is configured to determine, based on a field of a first instruction, a number of additional instructions to execute in conjunction with the first instruction and prior to execution of the first instruction.

16 Claims, 3 Drawing Sheets

(56) References Cited

U.S. PATENT DOCUMENTS

| | | | | |
|---|---|---|---|---|
| 6,910,123 | B1* | 6/2005 | Bosshart | G06F 9/30072 712/226 |
| 2004/0133432 | A1* | 7/2004 | Sugumar | G06F 9/3013 712/218 |
| 2004/0193844 | A1* | 9/2004 | Thimmannagari | G06F 9/3838 712/209 |
| 2005/0055534 | A1* | 3/2005 | Moyer | G06F 9/30043 712/4 |
| 2006/0036837 | A1* | 2/2006 | Stark | G06F 9/3848 712/239 |
| 2010/0205408 | A1* | 8/2010 | Chung | G06F 9/466 712/216 |
| 2012/0144128 | A1* | 6/2012 | Serebrin | G06F 9/467 711/149 |
| 2012/0254591 | A1* | 10/2012 | Hughes | G06F 9/30018 712/205 |

OTHER PUBLICATIONS

Atomic Operation, Mar. 7, 2012, Techopedia, 3 pages, [retrieved from the internet on Nov. 2, 2018], retrieved from URL <www.techopedia.com/definition/3466/atomic-operation>.*

Hennessy and Patterson, Computer Architecture A Quantitative Approach, 1996, Morgan Kaufmann, 2nd edition, 5 pages.*

Jankowski et al, Apr. 2012, Intel Polynomial Multiplication Instruction and its Usage for Elliptic Curve Cryptography, 17 pages, retrieved from the internet on Dec. 9, 2019, retrieved from <www.intel.com/content/dam/www/public/US/en/documents/white-papers/polynomial-multiplication-instructions-paper.pdf> (Year: 2012).*

Gopal et al, Fast CRC Computation for Generic Polynomials Using PCLMULQDQ Instruction, Dec. 2009, 23 pages, retrieved from the internet on Dec. 9, 2019, retrieved from <www.intel.com/content/dam/www/public/US/en/documents/white-papers/fast-crc-computation-generic-polynomials-pclmulqdq-paper.pdf> (Year: 2009).*

* cited by examiner

EXECUTION OF ADDITIONAL INSTRUCTIONS PRIOR TO A FIRST INSTRUCTION IN AN INTERRUPTIBLE OR NON-INTERRUPTIBLE MANNER AS SPECIFIED IN AN INSTRUCTION FIELD

CROSS REFERENCE TO RELATED APPLICATION(S)

This continuation application claims priority to U.S. patent application Ser. No. 13/628,376, filed Sep. 27, 2012, which application is incorporated herein by reference.

BACKGROUND

Microprocessors (processors) are instruction execution devices that are applied, in various forms, to provide control, communication, data processing capabilities, etc. to an incorporating system. Processors include execution units to provide data manipulation functionality. Exemplary execution units may provide arithmetic operations, logical operations, floating point operations etc. Processors invoke the functionality of the execution units in accordance with the requirements of the instructions executed by the processor.

SUMMARY

A processor and execution unit providing concatenation of instructions for execution are disclosed herein. In one embodiment, a processor includes a plurality of execution units. At least one of the execution units is configured to determine, based on a field of a first instruction, a number of additional instructions to execute in conjunction with the first instruction and prior to execution of the first instruction.

In another embodiment, an execution unit for executing instructions in a processor includes instruction execution logic. The instruction execution logic is configured to extract a value from a field of a first instruction, and to determine, based on the value, a number of additional instructions to execute in conjunction with the first instruction before execution of the first instruction is complete.

In a further embodiment, a method for executing instructions in an execution unit of a processor includes extracting, by the execution unit, a value from a field of a first instruction. Based on the value, a number of additional instructions to execute in conjunction with the first instruction is determined by the execution unit. The additional instructions are executed, by the execution unit, before execution of the first instruction is complete. In some embodiments, the additional instructions may be executed after execution of the first instruction is complete.

BRIEF DESCRIPTION OF THE DRAWINGS

For a detailed description of exemplary embodiments of the invention, reference will now be made to the accompanying drawings in which.

NOTATION AND NOMENCLATURE

Figure 1:
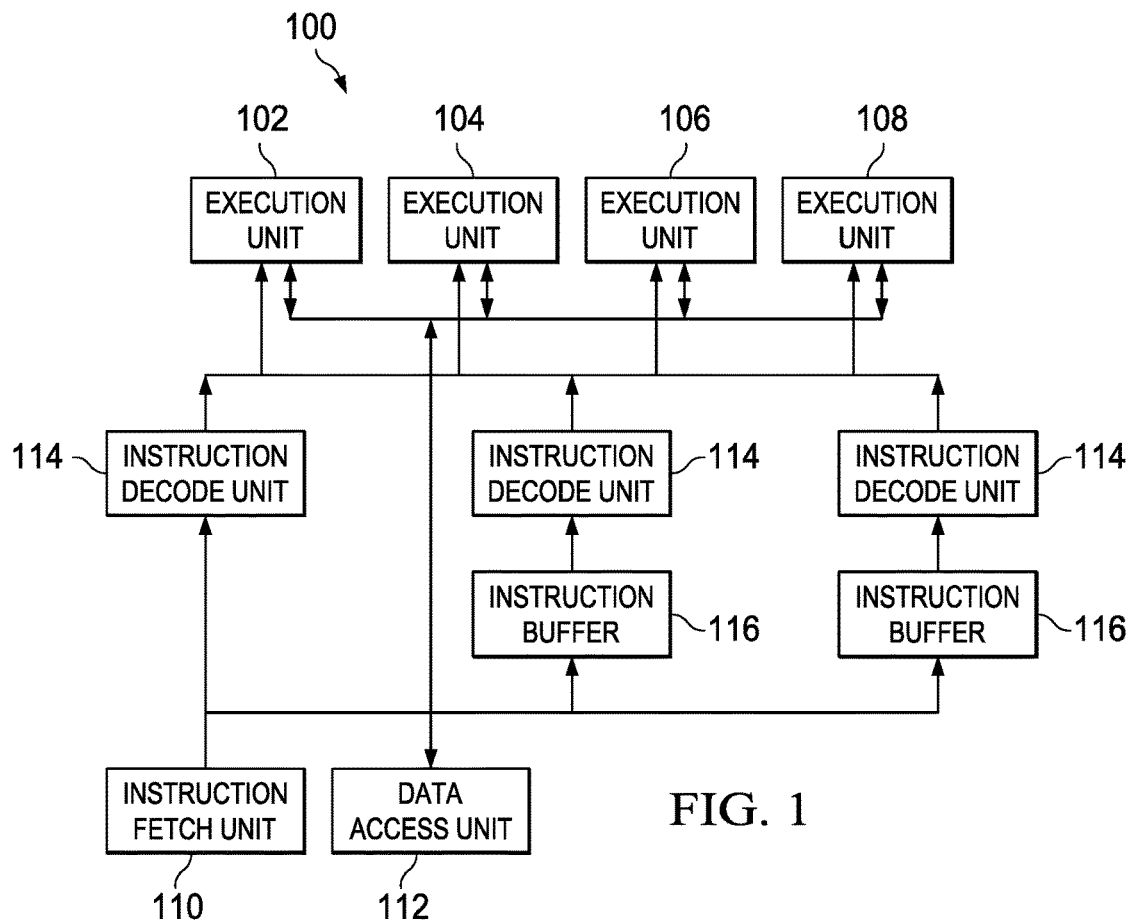
FIG. 1 shows a block diagram of a processor in accordance with various embodiments.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. Further, the term "software" includes any executable code capable of running on a processor, regardless of the media used to store the software. Thus, code stored in memory (e.g., non-volatile memory), and sometimes referred to as "embedded firmware," is included within the definition of software. The recitation "based on" is intended to mean "based at least in part on." Therefore, if X is based on Y, X may be based on Y and any number of other factors.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Execution units implemented in various processor architectures may require one or more instruction cycles to execute an instruction. For example, a reduced instruction set architecture may execute simple instructions in a single instruction cycle, while a complex instruction set architecture may execute complex instructions in a plurality of instruction cycles. Inclusion of execution units configured to execute complex instructions allows for efficient provision of complicated functionality.

In conventional processors, each execution unit may execute a particular instruction set corresponding to the unique functionality provided by the execution unit. For example, in a processor including an integer operation execution unit and a floating point operation unit, the execution unit that performs floating point operations executes instructions tailored to the floating point execution unit and does not execute an instruction set tailored to an integer execution unit of the processor. As a result, the instruction set of the processor may include a number of instructions providing redundant functionality. Additionally, instructions executed by one execution unit may require that related or supporting operations be performed by a different execution unit.

Embodiments of the processor disclosed herein include a plurality of execution units configured to execute different instructions in parallel. Embodiments of the execution units may execute complex instructions that require multiple (e.g., thousands) instruction cycles to execute. The execution units may execute a common set of instructions, such as data movement instructions, required to support the execution of the complex instructions. Thus, embodiments may reduce the overall size of the instruction set executed by the execution units. Embodiments of the execution units may also identify a sequence of instructions associated with a complex instruction, concatenate, and execute the instructions as a unit in an order required for proper execution of a complex instruction. To facilitate proper execution of the complex instruction, the execution units may further enforce atomic execution of at least some of the concatenated instructions.

FIG. 1 shows a block diagram of a processor 100 in accordance with various embodiments. The processor 100 includes a plurality of execution units 102, 104, 106, 108. Other embodiments may include one or more execution units. The processor 100 also includes an instruction fetch unit 110, a data access unit 112, and one or more instruction decode units 114. Some embodiments further include one or more instruction buffers 116. The processor 100 may also include other components and sub-systems that are omitted from FIG. 1 in the interest of clarity. For example, the processor 100 may include data storage resources, such as random access memory, communication interfaces and peripherals, timers, analog-to-digital converters, clock generators, debug logic, etc.

One or more of the execution units 102-108 can execute a complex instruction. For example, an execution unit (EU) 102-108 may be configured to execute a fast Fourier transform (FFT), execute a finite impulse response (FIR) filter, solve a trigonometric function, evaluate a polynomial, compute the length of a vector, etc. The execution units 102-108 allow complex instructions to be interrupted prior to completion of the instruction's execution. While an execution unit (e.g., EU 108) is servicing an interrupt, other execution units (EU 102-106) continue to execute other instructions. The execution units 102-108 may synchronize operation based on a requirement for a result and/or status generated by a different execution unit. For example, an execution unit 102 that requires a result value from execution unit 104 may stall until the execution unit 104 has produced the required result. One execution unit, e.g., a primary execution unit, may provide instructions to, or otherwise control the instruction execution sequence of, another execution unit.

To facilitate execution of complex instructions, the execution units 102-108 execute, in addition to various complex instructions, a set of core instructions, such as data movement instructions, that provide operations in support of the complex instructions. Thus, each of the execution units 102-108 may execute the same core instructions. An execution unit 102 may also identify, based on a field of an instruction, additional instructions that should be for executed in conjunction with the instruction (i.e., concatenated). For example, the execution unit 104 may identify a complex instruction and those instructions that support the complex instruction as instructions to be executed as a unit. Different instructions may specify a different number and/or grouping of instructions to be executed as a unit. Embodiments of the execution units 102-108 may further recognize, based on a field of a complex instruction, which of the instructions to be executed as a unit are to be atomically executed, where atomic execution is uninterruptible execution. An instruction may specify one or more portions of the set of instructions to be executed as a unit to be atomically executed, and the number and grouping of atomically executed portions may vary from instruction to instruction.

The instruction fetch unit 110 retrieves instructions from storage (not shown) for execution by the processor 100. The instruction fetch unit 110 may provide the retrieved instructions to a decode unit 114. The decode unit 114 examines instructions, locates the various control sub-fields of the instructions, and generates decoded instructions for execution by the execution units 102-108. As shown in FIG. 1, multiple execution units may receive decoded instructions from an instruction decoder 114. In some embodiments, an instruction decoder 114 may be dedicated one or more execution units. Thus, each execution unit 102-108 may receive decoded instructions from an instruction decoder 114 coupled to only that execution unit, and/or from an instruction decoder 114 coupled to a plurality of execution units 102-108. Some embodiments of the processor 100 may also include more than one fetch unit 110, where a fetch unit 110 may provide instructions to one or more instruction decoder 114.

Embodiments of the processor 100 may also include one or more instruction buffers 116. The instruction buffers 116 store instructions for execution by the execution units 102-108. An instruction buffer 116 may be coupled to one or more execution units 102-108. An execution unit may execute instructions stored in an instruction buffer 116, thereby allowing other portions of the processor 100, for example other instruction buffers 116, the instruction fetch unit 110, and instruction storage (not shown), etc., to be maintained in a low-power or inoperative state. An execution unit may lock or freeze a portion of an instruction buffer 116, thereby preventing the instructions stored in the locked portion of the instruction buffer 116 from being overwritten. Execution of instructions stored in an instruction buffer 116 (e.g., a locked portion of an instruction buffer 116) may save power as no reloading of the instructions from external memory is necessary, and may speed up execution when the execution unit executing the instructions stored in the instruction buffer 116 is exiting a low-power state. An execution unit may call instructions stored in a locked portion of an instruction buffer 116 and return to any available power mode and/or any state or instruction location. The execution units 102-108 may also bypass an instruction buffer 116 to execute instructions not stored in the instruction buffer 116. For example, the execution unit 104 may execute instructions provided from the instruction buffer 116, instructions provided by the instruction fetch unit 110 that bypass the instruction buffer 116, and/or instructions provided by an execution unit 102, 106-108.

The instruction buffers 116 may also store, in conjunction with an instruction, control or other data that facilitate instruction execution. For example, information specifying a source of an instruction execution trigger, trigger conditions and/or trigger wait conditions, instruction sequencing information, information specifying whether a different execution unit or other processor hardware is to assist in instruction execution, etc. may be stored in an instruction buffer 116 in conjunction with an instruction.

The data access unit 112 retrieves data values from storage (not shown) and provides the retrieved data values to the execution units 102-108 for processing. Similarly, the data access unit 112 stores data values generated by the execution units 102-108 in a storage device (e.g., random access memory external to the processor 100). Some embodiments of the processor 100 may include more than one data access unit 112, where each data access unit 112 may be coupled to one or more of the execution units 102-108.

The execution units 102-108 may be configured to execute the same instructions, or different instructions. For example, given an instruction set that includes all of the instructions executable by the execution units 102-108, in some embodiments of the processor 100, all or a plurality of the execution units 102-108 may be configured to execute all of the instructions of the instruction set. Alternatively, some execution units 102-108 may execute only a sub-set of the instructions of the instruction set. At least one of the execution units 102-108 is configured to execute a complex instruction that requires a plurality of instruction cycles to execute.

Each execution unit 102-108 is configured to control access to the resources of the processor 100 needed by the execution unit to execute an instruction. For example, each execution unit 102-108 can enable power to an instruction buffer 116 if the execution unit is to execute an instruction stored in the instruction buffer 116 while other instruction buffers, and other portions of the processor 100, remain in a low power state. Thus, each execution unit 102-108 is able to independently control access to resources of the processor 100 (power, clock frequency, etc.) external to the execution unit needed to execute instructions, and to operate independently from other components of the processor 100.

Figure 2:
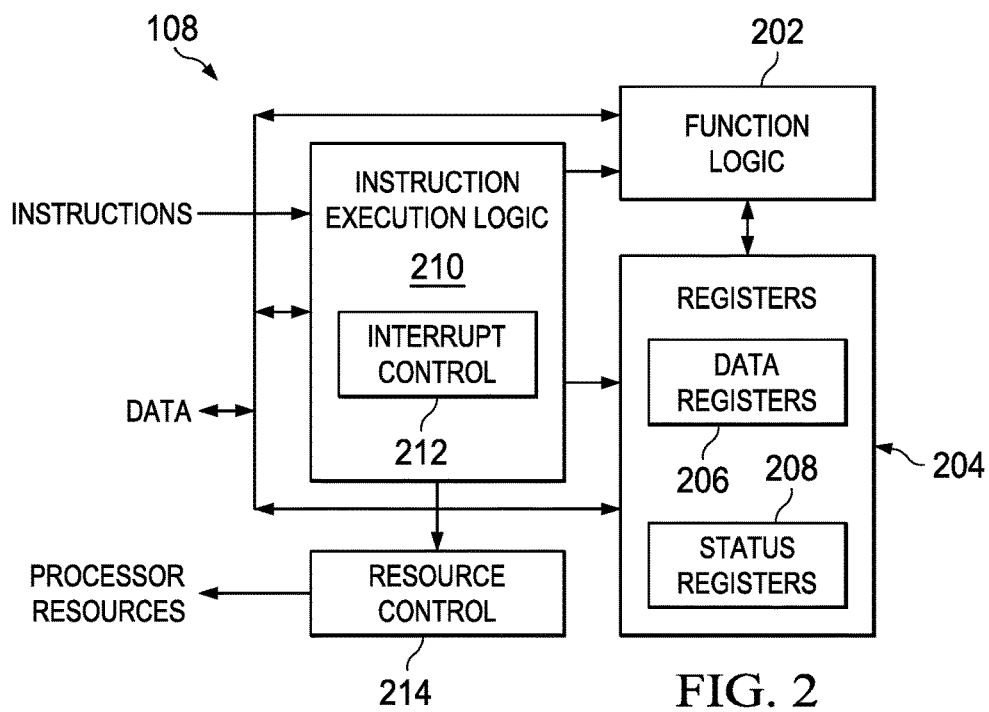
FIG. 2 shows a block diagram for an execution unit in accordance with various embodiments.

FIG. 2 shows a block diagram for an execution unit 108 in accordance with various embodiments. The block diagram and explanation thereof may also be applicable to embodiments of the execution units 102-106. The execution unit 108 includes function logic 202, registers 204, and instruction execution logic 210. The function logic 202 includes the arithmetic, logical, and other data manipulation resources for executing the instructions relevant to the execution unit 108. For example, the function logic may include adders, multipliers, shifters, logical functions, etc. for integer, fixed point, and/or floating point operations in accordance with the instructions to be executed by the execution unit 108.

The registers 204 include data registers 206 and status registers 208. The data registers 206 store operands to be processed by, and results produced by, the function logic 202. The number and/or size of registers included in the data registers 206 may vary across embodiments. For example, one embodiment may include 16 16-bit data registers, and another embodiment may include a different number and/or width of registers. The status registers 208 include one or more registers that store state information produced by operations performed by the function logic 202 and/or store instruction execution and/or execution unit state information. State information stored in a status register 208 may include a zero result indicator, a carry indicator, result sign indicator, overflow indicator, interrupt enable indicator, instruction execution state, etc. The registers 204 may also include registers that store addresses, configuration information, calibration information, etc.

The instruction execution logic 210 controls the sequencing of instruction execution in the execution unit 108. The instruction execution logic 210 may include one or more state machines that control the operations performed by the function logic 202 and transfer of data between the registers 204, the function logic 202, other execution units 102-106, the data access unit 112, and/or other components of the processor 100 in accordance with an instruction being executed. For example, the instruction execution logic 210 may include a state machine or other control device that sequences the multiple successive operations of a complex instruction being executed by the execution unit 108.

Execution of a complex instruction that processes one or more data values requires that the data values to be processed be provided to the execution unit 108. In embodiments of the execution unit 108, a number of additional instructions associated with complex instruction may be executed to move data to be processed into the execution unit 108, to move results of execution, etc. The additional instructions may move data within the execution unit 108 or between the execution unit 108 and a different execution unit. For example, operands may be moved into the execution unit 108 via the data access unit 112. Accordingly, to execute a complex instruction, the execution unit 108 may analyze a complex instruction, and based on information extracted from one or more fields of the instruction, determine how many instructions in addition to the complex instruction should be executed in conjunction with the complex instruction. The additional instructions may be stored and/or provided to the execution 108 immediately subsequent to the complex instruction or stored a location remote from the first instruction.

The instruction execution logic 210 includes interrupt control logic 212 that allows complex instructions executing in the execution unit 108 to be interrupted. The interrupt control logic 212 detects conditions, such as an interrupt event or reception of an instruction to be executed, that dictate interruption of a currently executing complex instruction. Responsive to detection of such a condition, the interrupt control logic 212 may cause the instruction execution logic 210 to suspend execution of the complex instruction and store in the registers 204, or other storage resource (e.g., a memory), information indicative of the state of the execution unit 108 at the point of suspension of execution (e.g., status register values, relevant data values, instruction execution sequence information, etc.). When the complex instruction execution state information has been saved, the instruction execution logic 210 sequences the execution unit 108 through the operations of a first interrupt service instruction, and any subsequent interrupt service instructions. On completion of the interrupt service, the instruction execution logic 210 restores the saved complex instruction execution state information to the registers 204 and the instruction execution logic 210, and resumes execution of the interrupted complex instruction.

When the instruction execution logic 210 receives a given instruction for execution, the instruction execution logic 210 may examine the instruction and determine which of the supporting instructions to be executed in conjunction with the given instruction are to be atomically executed (i.e., which instructions are not interruptible). The instruction execution logic 210 executes the supporting instructions defined as being atomic with interruption disabled and executes the supporting instructions defined as being non-atomic with interruption enabled.

The execution unit 108 also includes resource control logic 214. The resource control logic 214 requests access to the various resources (e.g., storage, power, clock frequency, etc.) of the processor 100 that the execution unit 108 uses to execute an instruction. By requesting processor resources independently for each execution unit 102-108, the power consumed by the processor 100 may be reduced by placing only components of the processor 100 required for instruction execution by an active execution unit 102-108 in an active power state. Furthermore, execution units 102-108 not executing instructions may be placed in a low-power state to reduce the power consumption of the processor 100.

An instruction (e.g., a complex instruction) may convey, to the instruction execution logic 210, information indicative of the number of successive supporting instructions to be executed with the instruction (i.e., instruction concatenation information) in a variety of ways. FIGS. 3A-3H show exemplary instructions that include instruction concatenation information in accordance with various embodiments. The instruction 300 shown in FIG. 3A does not include express designation of the number of instructions to be concatenated. Instead, with the instruction 300, the instruction execution logic 210 determines the number of subsequent instructions to be concatenated with the instruction 300 based on the value of the instruction ID field. For example, the instruction execution logic 210 may determine that the instruction ID of the SQRT (square root) instruction 300 requires concatenation of one subsequent instruction (LOAD) as shown in the following instruction sequence. The instruction execution logic 210 executes the LOAD instruction prior to square root computation.

SQRT Sequence

Figure 3A:
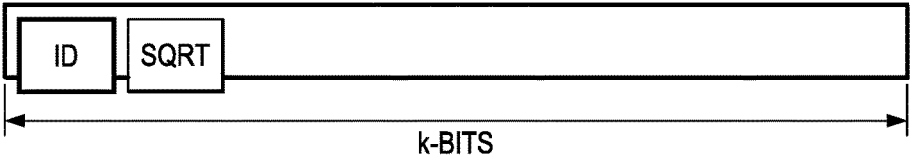
FIGS. 3A-3H show exemplary instructions that include instruction concatenation information in accordance with various embodiments.
Figure 3B:
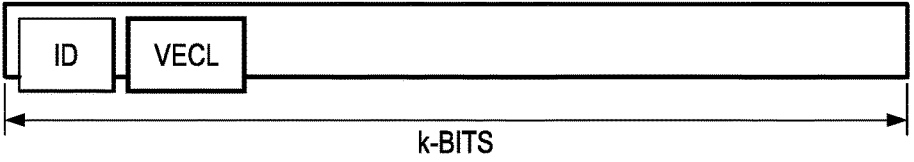
Figure 3C:
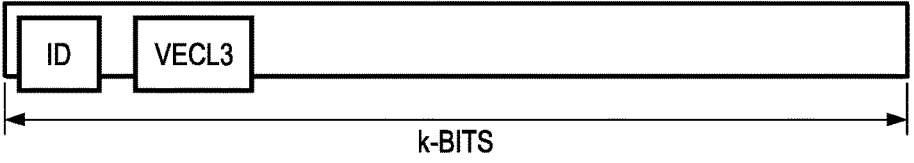

SQRT Rx,Ry ; SQRT is executed in an execution unit
  ; SQRT requires only one parameter
LOAD &X,Rx ; LOAD Rx in execution unit from address X
  ; and trigger SQRT operation after receiving the operand
The instruction 302 shown in FIG. 3B does not include express designation of the number of instructions to be concatenated. Instead, the instruction execution logic 210 determines the number of subsequent instructions to be concatenated with the instruction 302 based on the value of the instruction function (opcode) field. For example, the instruction execution logic 210 may determine that the instruction opcode of the VECL (vector length) instruction requires concatenation of two subsequent instructions as shown in the following instruction sequence. The instruction execution logic 210 executes at least one of the LOAD instructions prior to vector length computation.
VECL Rx,Ry ; VECL is executed in an EU
LOAD &X,Rx ; LOAD Rx and Rx+1 in EU from address X and X+2 (X is 16-bit)
LOAD &(X+2),R(x+1) ; trigger VECL operation after receiving the operand
  ; VECL needs X-data and Y-data to calculate the vector length
  ; the operation of the VECL instruction may start after execution of
  ; the first load instruction Ry=SQRT{Rx*Rx+R(x+1)*R(x+1)}
The instruction 304 shown in FIG. 3C does not include express designation of the number of instructions to be concatenated. Instead, the instruction execution logic 210 determines the number of subsequent instructions to be concatenated with the instruction 304 based on the value of the instruction ID and the instruction opcode fields. Different instruction and opcode field combinations may define a different number of instructions be concatenated. In FIG. 3C, for example, the instruction execution logic 210 may determine that the combined instruction ID and instruction opcode of the VECL3 (vector length) instruction 304 requires concatenation of three subsequent instructions as shown in the following instruction sequence. The instruction execution logic 210 executes at least one of the LOAD instructions prior to vector length computation.

VECL Rx,Ry ; VECL is executed in an EU
LOAD &X,Rx ; LOAD registers Rx, Rx+1, Rx+2 in EU from address X, X+2, X+4
LOAD &(X+2), R(x+1) ; VECL operation is triggered after receiving the operand
LOAD &(X+4),R(x+2) ; VECL needs X-data, Y-data, and Z-data to calculate the
  ; vector length, and VECL instruction may start after the first
  ; load instruction Ry=CUBE{Rx,R(x+1),R(x+2)}.

Figure 3D:
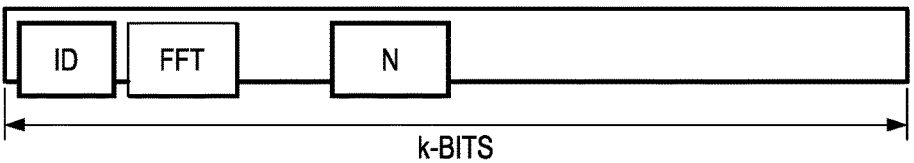
Figure 3E:
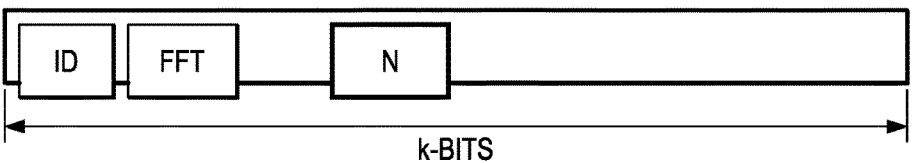
Figure 3F:
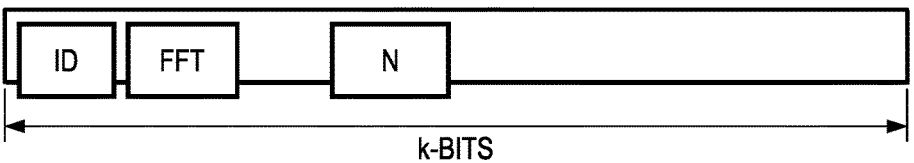

Some instructions include a distinct field that carries information specifying the number of subsequent instructions to be concatenated with the instruction. The instructions shown in FIGS. 3D-3F include a field N that designates the number of instructions to be concatenated. As shown in FIG. 3E, in some embodiments, the field N alone specifies the number of instructions to be concatenated. In some embodiments the value of the concatenation field N in conjunction with instruction ID and/or opcode specify the number of instructions to be concatenated, as shown in FIGS. 3D and 3F. The instruction sequence below shows an FFT instruction specifying five subsequent instructions to be concatenated for execution with the FFT instruction. The instruction execution logic 210 executes at least one of the LOAD instructions prior to FFT computation.
FFT #5 ; FFT is executed in an EU & needs 5 parameters to operate
  ; FFT size, data format (e.g. fractional), real/imaginary data array[0]
  ; address VP data ready, array[0] address O/P data
LOAD &X, Rx ; LOAD Rx, Rx+1, Rx+2, Rx+3, Rx+4 in EU
LOAD &(X+2),R(x+1) ; from address X, X+2, X+4, X+6, X+8
LOAD &(X+4), R(x+2)
LOAD.L &(X+6), R(x+3)
LOAD.L &(X+10),R(x+4)

Figure 3G:
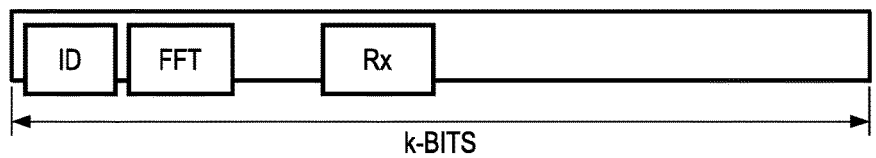
Figure 3H:
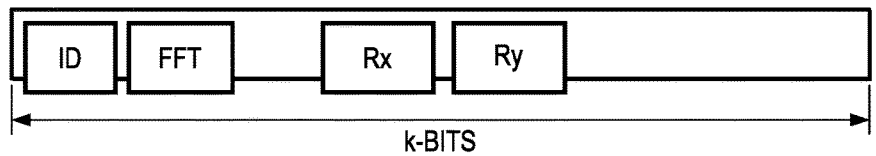

In another embodiment, an instruction may include a field that contains information for indirectly specifying the number of subsequent instructions to be concatenated with the instruction. For example, the field may contain information identifying a register or memory location containing information specifying the number of subsequent instructions to be concatenated with the instruction. FIG. 3G shows an instruction 306 that includes a concatenation specification field Rx specifying a register or memory location that includes concatenation information. In some embodiments, the field Rx contains information specifying the location of information specifying the number of instructions subsequent to the instruction to be concatenated with the instruction. In some embodiments, the field Rx contains information specifying the location of information specifying the location of additional instructions and the number of additional instructions to be concatenated with the instruction. FIG. 3H shows an instruction 308 that includes concatenation specification fields Rx and Ry. Field Rx contains information specifying the location of information specifying the number of additional instructions to be concatenated with the instruction. Field Ry contains information specifying the location of the additional instructions.

Some embodiments of the instruction execution logic 210 atomically execute at least some of the concatenated instructions. An instruction may specify which of the concatenated instructions are to be atomically executed. Atomic execution of the concatenated instructions is advantageous when one or more of the concatenated instructions must be executed to trigger execution of the function (e.g., FFT, VECL, SQRT, etc.). For example, to trigger execution of the SQRT function in the SQRT sequence shown above, the LOAD instruction following the SQRT must be executed prior to starting to execute the SQRT instruction. If an interrupt delays execution of the LOAD instruction, then the SQRT instruction will not executed in parallel with the interrupt service, wasting time and power.

In some embodiments, the instruction execution logic 210 may identify concatenated instructions to be atomically executed based on instruction ID and/or opcode of the instruction specifying concatenation. For example, the ID or opcode of the SQRT instruction may indicate to the instruction execution logic 210 that the one instruction (i.e. LOAD) concatenated with the SQRT instruction is to be atomically executed. The instruction execution logic 210 may identify one or more concatenated instructions in one or more instruction groups for atomic execution based on the ID and/or opcode of the instruction specifying the concatenation.

Figure 4A:
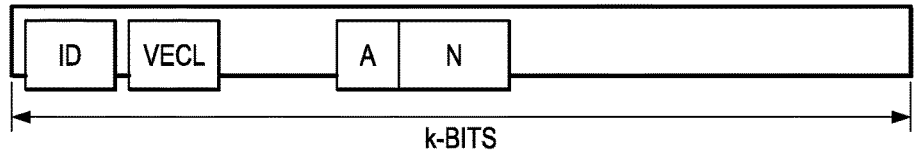
FIGS. 4A-4B show exemplary instructions that include concatenation information and an atomic execution information in accordance with various embodiments.
Figure 4B:
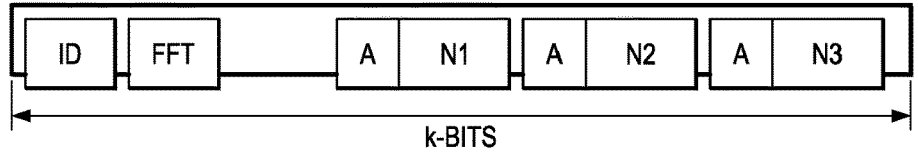

Some instructions include a distinct field that carries information specifying the number of subsequent instructions to be atomically executed. FIGS. 4A-4B show exemplary instructions that include concatenation information and atomic execution information in accordance with various embodiments. Instructions may include one or more instruction concatenation specification and associated atomic execution fields that may define concatenated instruction sequences as being atomic or non-atomic. Non-atomic sequences may follow atomic sequences and atomic sequences may follow non-atomic sequences in accordance with the instruction defined atomicity specification.

Figure 5:
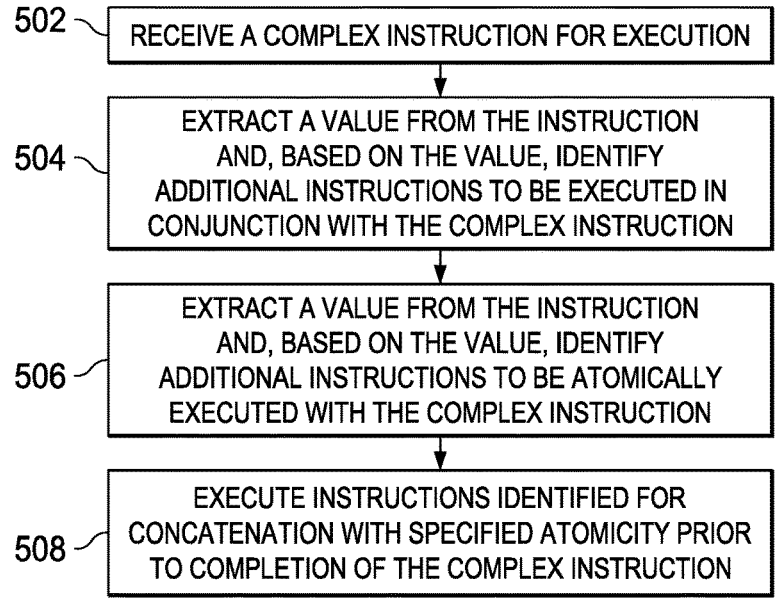
FIG. 5 shows a flow diagram for a method for executing a complex instruction by a processor in accordance with various embodiments.

In some embodiments of the instruction execution logic 210, instructions subsequent to given function instruction (e.g., FFT) are concatenated and/or atomically executed until a releasing instruction is executed. For example, for the instruction sequence below, the instruction execution logic 210 may concatenate and/or atomically execute all instructions subsequent to the FFT instruction until the WAITE instruction is executed. The WAITE instruction releases concatenation and/or atomic execution. Instructions that disable concatenation and/or atomic execution of concatenated instructions may include instructions dedicated to release of concatenation/atomic execution, program flow change instructions (e.g., jump, branch, call, etc.), context switch instructions, instructions that include a flag or control field specifying release of atomicity or concatenation, etc.
FFT A ; FFT is executed in an EU & needs 5 parameters to operate
 ; FFT size, data format (e.g. fractional), real/imaginary data array[0]
 ; address VP data ready, array[0] address O/P data
LOAD &X,Rx ; LOAD Rx, Rx+1, Rx+2, Rx+3, Rx+4 in EU
LOAD &(X+2),R(x+1) ; from address X, X+2, X+4, X+6, X+10
LOAD &(X+4), R(x+2)
LOAD.L &(X+6), R(x+3)
LOAD.L &(X+10),R(x+4)
WAITE ; FFT initialized and executing, atomic execution disabled FIG. 5 shows a flow diagram for a method 500 for executing a complex instruction by a processor in accordance with various embodiments. Though depicted sequentially as a matter of convenience, at least some of the actions shown can be performed in a different order and/or performed in parallel. Additionally, some embodiments may perform only some of the actions shown.

In block 502, a complex instruction is issued to an execution unit (e.g., execution unit 104) of the processor 100 for execution. The complex instruction (e.g., an FFT instruction) may require many instruction cycles to execute.

In block 504, the execution unit 104 analyzes the instruction and extracts from a field of the instruction a value indicative of a number and/or location of additional instructions to be concatenated with the instruction. The field may be, for example, an instruction ID field, an opcode field, and/or a dedicated concatenation information field. Embodiments may determine the value based on one or more fields of the instruction. The value may directly or indirectly specify the number of instructions to be concatenated with the complex instruction. Based on the value, the execution unit 104 identifies the additional instructions (e.g., instructions subsequent to the complex instruction) that are to be executed as a unit with the complex instruction. For example, the identified instructions may be instructions to be executed prior to and to initialize execution of the complex instruction or instructions to executed at an intermediate point of execution of the complex instruction. For example, a concatenated instruction may be executed at an intermediate point of execution of the complex instruction at which the complex instruction has generated a result (e.g., one of a plurality of results) prior to completion of execution.

In block 506, the execution unit 104 analyzes the complex instruction and extracts from a field of the instruction a value or values indicative of which of the concatenated instructions are to be atomically executed. The field may be, for example, an instruction ID field, an opcode field, and/or a dedicated atomicity information field. Embodiments may determine the value based on one or more fields of the instruction. The value(s) may directly or indirectly specify which instructions are to be atomically executed. Based on the value(s), the execution unit 104 identifies the additional instructions that are to be atomically executed. In some embodiments, the value may identify an event that specifies a start or end of atomic or non-atomic execution.

In block 508, the execution unit 104 executes the additional instructions identified for concatenation. Some of the concatenated instructions may be atomically executed in accordance with the atomicity information provided via the complex instruction. In some embodiments, in accordance with the atomicity information, the concatenated instructions may be atomically executed until an instruction designated to release atomicity is executed. The execution unit 104 may initiate or complete execution of the complex instruction after execution of one or more of the concatenated instructions.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:
1. A processor, comprising:
 execution units comprising a first execution unit and a second execution unit, the first execution unit configured to:
  execute a first instruction, the first instruction comprising a first field indicating a number of concatenated instructions and a second field indicating an explicit indicator of atomicity of the concatenated instructions;

identify, based on the number of concatenated instructions, a second instruction of the concatenated instructions for the second execution unit to execute; and determine an atomicity of the second instruction based on the explicit indicator of atomicity of the concatenated instructions;

wherein the second execution unit is configured to execute the second instruction with the atomicity of the second instruction; and wherein the number of concatenated instructions is a first number of first concatenated instructions and the atomicity of the concatenated instructions is a first atomicity of the first concatenated instructions, the first instruction further comprising a third field indicating a second number of second concatenated instructions and a fourth field indicating a second atomicity of the second concatenated instructions.

2. The processor of claim 1, further comprising an instruction decoder coupled to the execution units, and the instruction decoder configured to provide decoded instructions to the execution units.

3. The processor of claim 1, wherein the second instruction is stored immediately subsequent to the first instruction.

4. The processor of claim 1, further comprising an instruction fetch unit configured to retrieve the first instruction from storage for execution by the processor.

5. The processor of claim 1, further comprising an instruction buffer coupled to the first execution unit and to the second execution unit.

6. The processor of claim 1, wherein the first instruction is an instruction to perform a fast Fourier transform (FFT), perform a finite impulse response (FIR) filter, solve a trigonometric function, evaluate a polynomial, or compute a length of a vector.

7. The processor of claim 1, wherein the atomicity of the second instruction is that the second instruction is to be atomically executed with the first instruction.

8. The processor of claim 1, wherein the atomicity of the second instruction is that the second instruction is to not be atomically executed with the first instruction.

9. The processor of claim 1, wherein the execution units further comprises a third execution unit, the first execution unit further configured to:
identify, based on the second number of the second concatenated instructions, a third instruction of the second concatenated instructions for the third execution unit to execute; and determine an atomicity of the third instruction based on the second atomicity of the second concatenated instructions; and wherein the third execution unit is configured to execute the third instruction with the atomicity of the third instruction.

10. The processor of claim 9, wherein the atomicity of the second instruction is different than the atomicity of the third instruction.

11. The processor of claim 9, wherein the atomicity of the second instruction is the same as the atomicity of the third instruction.

12. An execution unit comprising:
instruction execution logic comprising at least one state machine, the instruction execution logic configured to:
execute a first instruction, the first instruction comprising a first field indicating a number of concatenated instructions and a second field indicating an explicit indicator of atomicity of the concatenated instructions;

identify, based on the number of concatenated instructions, a second instruction of the concatenated instructions to execute on a second execution unit; and determine an atomicity of the second instruction based on the explicit indicator of atomicity of the concatenated instructions;

wherein the number of concatenated instructions is a first number of first concatenated instructions and the atomicity of the concatenated instructions is a first atomicity of the first concatenated instructions, the first instruction further comprising a third field indicating a second number of second concatenated instructions and a fourth field indicating a second atomicity of the second concatenated instructions.

13. The execution unit of claim 12, wherein the instruction execution logic is configured to identify that an instruction stored immediately subsequent to the first instruction is the second instruction.

14. The execution unit of claim 12, wherein the first instruction is an instruction to perform a fast Fourier transform (FFT), perform a finite impulse response (FIR) filter, solve a trigonometric function, evaluate a polynomial, or compute a length of a vector.

15. A method comprising:
executing, by a first execution unit of a processor, a first instruction, the first instruction comprising a first field indicating a number of concatenated instructions and a second field indicating an explicit indicator of atomicity of the concatenated instructions;

identifying, by the first execution unit, based on the number of concatenated instructions, a second instruction of the concatenated instructions for a second execution unit to execute;

determining, by the first execution unit, an atomicity of the second instruction based on the explicit indicator of atomicity of the concatenated instructions; and executing, by the second execution unit of the processor, the second instruction with the atomicity of the second instruction;

wherein the number of concatenated instructions is a first number of first concatenated instructions and the atomicity of the concatenated instructions is a first atomicity of the first concatenated instructions, the first instruction further comprising a third field indicating a second number of second concatenated instructions and a fourth field indicating a second atomicity of the second concatenated instructions.

16. The method of claim 15, wherein the first instruction is an instruction to perform a fast Fourier transform (FFT), perform a finite impulse response (FIR) filter, solve a trigonometric function, evaluate a polynomial, or compute a length of a vector.

* * * * *